United States Patent

[11] 3,603,891

[72] Inventor Bernard Jules Alexandre Simeau
Saint-Etienne, France

[21] Appl. No. 732,733
[22] Filed May 28, 1968
[45] Patented Sept. 7, 1971
[73] Assignee Constructions Radioelectriques et
Electroniques du Centre
Loire, France

[54] AMPLIFYING DEVICE WITH WIDE TRANSMISSION BAND AND SLIGHT DRIFT ENABLING A CONTINUOUS COMPONENT TO BE TRANSMITTED
1 Claim, 3 Drawing Figs.

[52] U.S. Cl. .......... 330/9, 330/35, 330/24
[51] Int. Cl. .......... H03f 1/02
[50] Field of Search .......... 330/9

[56] References Cited
UNITED STATES PATENTS

| | | | |
|---|---|---|---|
| 3,218,566 | 11/1965 | Hayes, Jr. .......... | 330/9 |
| 3,237,117 | 2/1966 | Collings et al. .......... | 330/9 |
| 3,382,461 | 5/1968 | Wolcott .......... | 331/183 |
| 3,383,610 | 5/1968 | Kedson .......... | 330/16 |
| 2,619,552 | 11/1952 | Kerns .......... | 330/9 |

*Primary Examiner*—Nathan Kaufman
*Attorney*—Pierce, Scheffler and Parker

ABSTRACT: An amplifying arrangement having a wide transmission band and slight drift which enables a continuous high frequency signal component to be transmitted uses two amplifiers, a first one with a wide transmission band and high input impedance and a second one with a low drift and slight transmission band, the inputs of the second amplifier being connected one to a reference fixed potential, the other to one of the inputs of the first amplifier, the output of the second amplifier being connected to the second input of the first amplifier, thus elaborating at the output of the first amplifier a representative signal of the error committed by the first amplifier, said signal being injected in the input of the second amplifier for controlling the first amplifier.

AMPLIFYING DEVICE WITH WIDE TRANSMISSION BAND AND SLIGHT DRIFT ENABLING A CONTINUOUS COMPONENT TO BE TRANSMITTED

This invention relates to a high frequency amplifying device, with wide transmission band, low drift and high input impedance. The device is particularly adapted to amplifying an alternating current comprising a continuous component, and can be advantageously utilized as first stage of measuring appliances such as oscilloscopes.

The amplifying device according to the invention is a wide transmission band device, also able to transmit the continuous component, with also a low drift. The amplifying devices currently known have some of the above characteristics but they do not have all of them and for example: slight drift and high input impedance devices have only a reduced transmission band; wideband devices, when they are not of low input impedance, are submitted to a considerable drift of thermic or mechanical origin.

SUMMARY OF THE INVENTION

The amplifying device in accordance with the invention which has a wide transmission band, slight drift and which enables a continuous component to be transmitted from a high frequency electrical signal comprises a first two-input high frequency amplifier having a wide transmission band and high input impedance and to the first input of which the electrical signal is directly applied, and a second two-input amplifier having low drift, large amplification, small transmission band and low impedance. The first input to the second amplifier is connected to a fixed reference potential, the second input to the second amplifier is connected to the first input of the first amplifier through a known impedance thus in parallel relationship with the high input impedance of the first amplifier, and the output of the second amplifier is directly connected to the second input of the first amplifier which thus develops at the output of the first amplifier a signal representative of the error committed by the first amplifier and whereby the error signal is thus injected into the second input of the second amplifier which thus functions as an error amplifier within the limits of its transmission band for controlling the first amplifier.

Other advantages and characteristics of the invention will become more apparent from the following description and the attached drawing, given by way of nonrestrictive examples, In this drawing.

Figure 1:
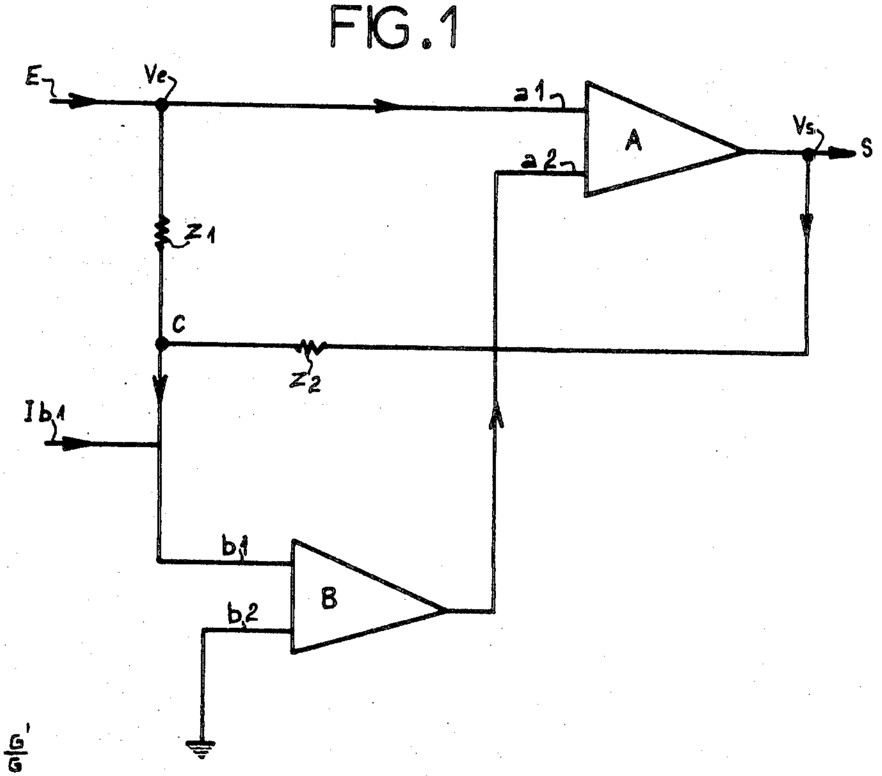
FIG. 1 is a synoptic diagram of a device according to the invention.

In FIG. 1, A and B respectively designate the first and second amplifier. Amplifier A has a wide transmission band, possessing satisfactory characteristics in the field of high frequencies. The signals for amplifying are applied to the terminal E connected to its input $a_1$ which is high impedance. $a_2$ is an auxiliary input intended to receive the correction signal supplied by amplifier B, a signal which can have any characteristics. The amplification G of this amplifier A is made stable in relation to the input $a_1$ and is negative. A negative feedback between the output S and the input $a_1$ comprises the mounting in series of two impedances $Z_1$ and $Z_2$ so that $Z_2/Z_1=G$ in absolute value (1). The point C, common to both impedances, is connected to the input $b_1$ of the amplifier B which has a low drift and a large amplification.

$I_{b1}$ designates a direct current supplied by a suitable source which is eventually injected into the input $b_1$. On a second input $b_2$ a reference voltage is applied called zero reference, to which must be compared the voltage of point C.

The device works as follows: at the output S of amplifier A, a signal received:

$$Vs=G.\ Ve\ (2)$$

$Vs$ and $Ve$ respectively designate the voltages existing on the terminals S and E. The impedance $Z_2$ being such that $Z_2=G\ Z_1$ according to the relation (1). The voltage appearing at point C is nil if the relation (2)is effectively satisfied. This is what is achieved in the field of high frequencies where the characteristics of amplifier A are satisfactory. In this case, we notice that nothing passes by amplifier B.

On the other hand, if the voltage $Vs$ does not follow the relation (2), there appears a representative voltage at point C, in magnitude and sign, of the error committed by amplifier A, this being able to come from various defects of this amplifier: irregularity of amplification, drift, noise, microphony. The error signal thus isolated is compared to the zero reference value by amplifier B and the amplified signal applied with suitable phase to the input $a_2$ of amplifier A so as to correct the error ascertained.

If there exists, between the input $b_1$ of amplifier B and the output S of the device, an amplification $-G'$, an error $\Delta Vs$ (assimilable to an error $\Delta Ve=-(\Delta Ve/G)$ brought to the input is reduced in the minimum ratio.

$$\frac{\Delta V's}{\Delta Vs}=\frac{\Delta V'e}{\Delta Ve}=\frac{1}{1+\frac{G'}{G}}$$

in designating par $V's$ and $V'e$ the errors at the output are brought to the input of the amplifier after the action of the correction device.

One generally takes $G'$ much greater than $G$ and, practically, the reduction coefficient of the defects of amplifier A being $1+(G'/G)$ is little different from $(G'/G)$. In this expression, the term $G'$ where the amplification of the amplifier B directly intervenes, is variable with the frequency owing to the reduced transmission band of the latter.

Figure 2:
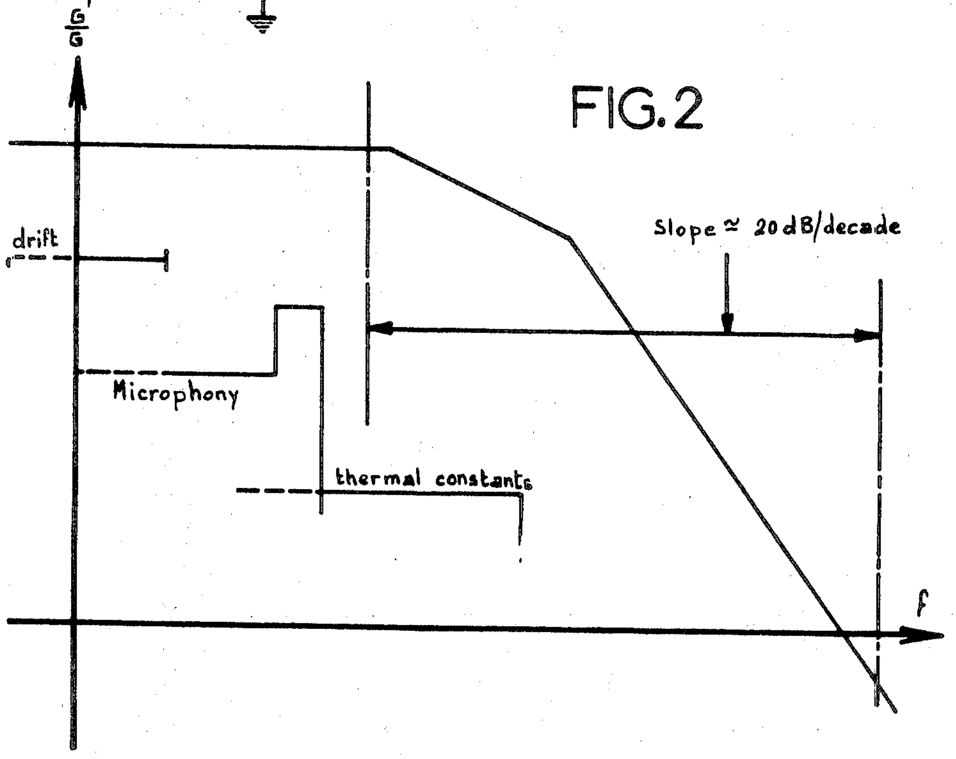
FIG. 2 is a diagram from which the characteristics of the second amplifier can be determined.

So as to ensure the stability of the subjection thus effected, one must also be careful to limit the slope of the curve of the amplification $G'$ as a function of the frequency $f$ to a value in the region of 20 db./decade. FIG. 2 shows an example of graphic ascertainment of the minimal characteristics of amplifier B from the various defects ascertained in amplifier A.

It is possible to evaluate the maximal amplitude of the various defects of amplifier A, likewise, the permissible amplitude of said defects for the application considered, and consequently, the reduction coefficient that will be necessary respectively to apply to them. Thus we obtain, allowing for the frequency spectrum of these defects, a gauge shown in FIG. 2 which must be less than the interior of the diagram $G'/G$ as a function of the frequency, so that the residual defects are less than the permissible limit provided for. In the figure, the defects (drift, microphony, thermal noise constants) are thus shown by the reduction coefficient that is necessary to apply to them for bringing them to this permissible value.

Apart from the advantages previously mentioned, this device has other qualities making it particularly apt for using as an input circuit for measuring appliances. Owing to the intrinsic negative reaction of the mounting, the input $b_1$ of amplifier B forms a point where the impedance is almost nil. This results that the impedance, seen from the input terminal E, is exclusively made of the impedance $Z_1$ in parallel with the impedance of the input $a_1$ of amplifier A; it is thus known with all the precision required for such applications.

Thus, the amplifier described has its output voltage $Vs$ at the potential of the earth when the input voltage $Ve$ is this potential itself.

For a certain number of applications, however, and in particular, for utilizing the amplifier as an oscilloscope input stage, it is desired to be able to act on the continuous output potential of the amplifier so as to cause a constant deviation of this output voltage $Vs$, the other characteristics of the amplifier particularly, its drift, remaining unchanged.

In the particular case of using the amplifier as an oscilloscope input amplifier, this action is shown by a displacement of the trace observed, an adjusting member effecting the phasing or deviation for the latter. Actually, the most frequent case of utilizing the amplifier consists, when a signal comprising a continuous component is examined, to bring the trace of the spot into the effective observation zone, and consequently, to compensate this continuous component by a phasing effected by injecting an auxiliary direct current $I_{b1}$. When this adjusting of phasing is gauged, for instance, by means of a control device by a precision potentiometer, the amplifier works as a comparator, a faculty generally reserved for differential amplifiers.

An important advantage resulting from the manner of operating the phasing of the amplifier, when this is necessary, is that its output voltage *Vs* is found to be brought to the vicinity of the potential of the earth, which would no longer be the case if this phase adjustment were effected subsequently. Thus, for such application, one limits the dynamic working range required from the amplifier, which facilitates the obtaining of high performances, specifically with regard to the transmission band.

In the general case, where amplifier B is not particularized, the signal applied to the input $b_1$ is taken in relation to the earth, the input $b_2$ being obviously at this zero potential. In the particular case where the input stage of this amplifier B is a differential stage, the comparison voltage applied to the input $b_2$ is a voltage taken as reference that may have any value, not necessarily nil if one desires to take account of corrective factors.

Moreover, the fact of utilizing a subjection amplifier B at differential inputs, enables one, by modifying the value of the reference voltage applied to $b_2$, to carry out annexed corrections, such, for instance, as compensating for the residual drifts of amplifier B.

Figure 3:
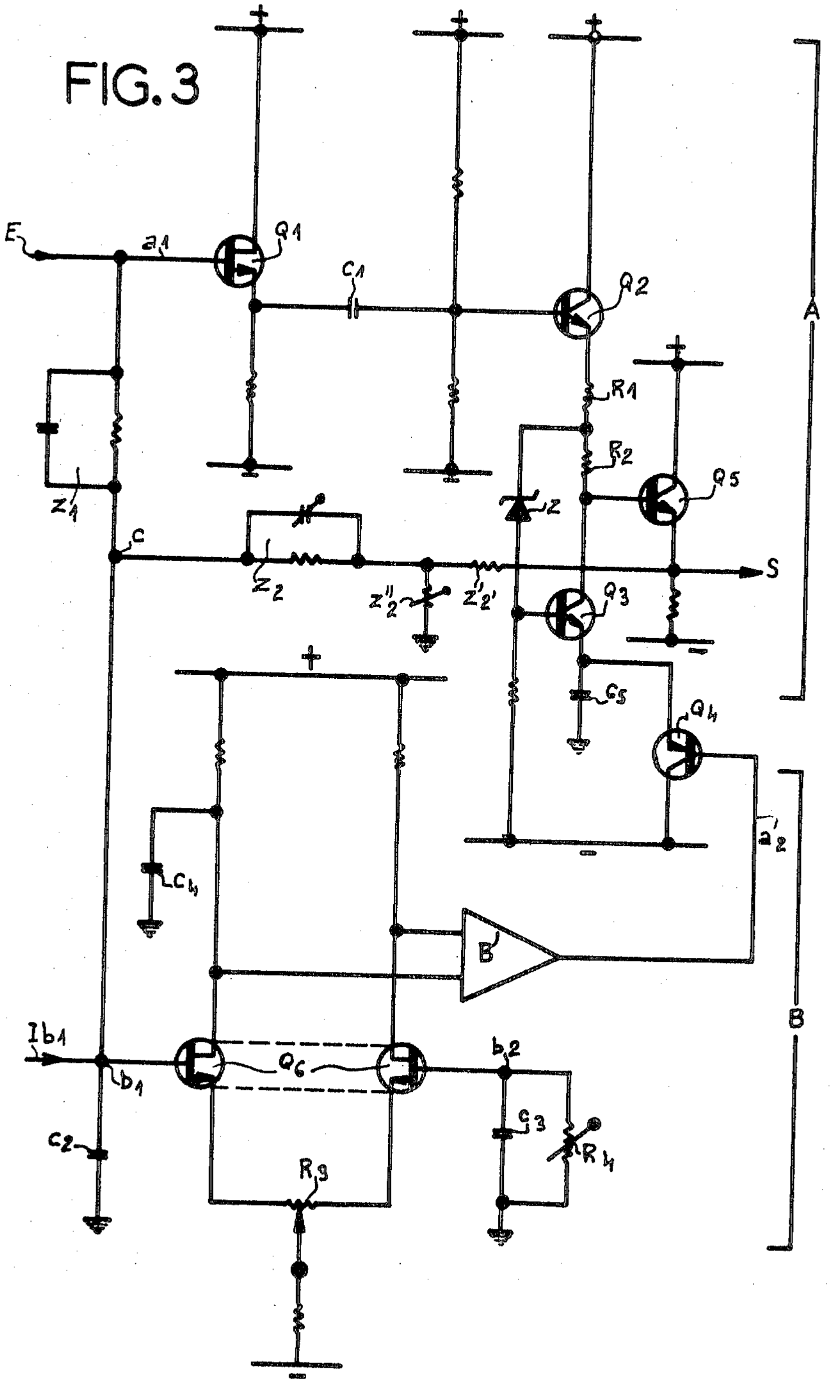
FIG. 3 shows the detailed diagram of a mode of embodiment preferred for a device according to the invention.

In the example of embodiment shown in FIG. 3, and in which the reference characters of FIG. 1 have been applied, amplifier A comprises five transistors $Q_1$ to $Q_5$. Transistor $Q_1$ with field effect forms the high impedance input stage; its base $a_1$ is connected to the input terminal E. Transistors $Q_2$ and $Q_5$ are essentially impedance adapters, the emitter of transistor $Q_2$ being connected to the base of $Q_5$ by two resistances $R_1$ and $R_2$ in series. The transistor with field effect $Q_1$ has its emitter connected to the base of transistor $Q_2$ by a condenser $C_1$. The common point to the resistances $R_1$ and $R_2$ is connected by means of a Zener diode z to the base of transistor $Q_3$ whose emitter is connected, on the hand, to earth by means of a condenser $C_5$, and on the other, to the emitter of transistor $Q_4$ whose base is used as auxiliary input $a_2$ connected to the output of amplifier B. The emitter of transistor $Q_5$ is connected to the output terminal S.

The input $b_1$ of amplifier B is, on the one hand, connected to the input $a_1$ of amplifier A by an impedance $Z_1$ formed, for instance, by a capacity-resistance network, and on the other hand, to earth by means of the condenser $C_2$.

The input member of amplifier B, from which one requires a particularly weak dielectric current is a double transistor with field effect $Q_6$ whose two bases respectively form the inputs $b_1$ and $b_2$. The input $b_2$ is connected to earth by the condenser $C_3$ and the variable resistance $R_4$. A potentiometer $R_3$ is placed in the emitter circuit of the transistor $Q_6$.

The collector circuit of the transistor $Q_6$ is connected to the base of the transistor $Q_4$ by an amplifier B′. The amplifier B′ does not directly belong to the invention, and has not been shown in detail; it can be operational amplifier of a known type and possessing the following characteristics:

wide amplification in an open loop
input impedance as wide as possible
relatively weak output impedance
continuous coupling
very slight drift brought to the input.

By way of information, it can be mentioned that such amplifier is made of transistors in tandem, generally of the complementary type, continuously coupled, and mounted, for instance, as a common emitter or according to the Darlington mounting.

The operation of the device is as follows: the output signal of the amplifier B′ attacking the base of the transistor $Q_4$, this transistor forms in the high frequency field a voltage source of weak internal impedance for the emitter of transistor $Q_3$. This transistor $Q_3$ being supposed to work at a linear rate, the potential of its base is thus ascertained, likewise that of the cathode of the Zener diode Z which is kept in its operating zone by an almost constant polarization current.

The common point to the resistances $R_1$, $R_2$ and the cathode of the Zener diode is thus a fixed potential, in the H.F. field by the effect of the negative reaction of voltage thus applied to the transistor $Q_3$. The current passing through the Zener diode being, moreover, appreciably constant, it results that any variation of the current in $R_1$ (due to a variation of the emitter potential of $Q_2$) is transmitted to $R_2$. The amplification of amplifier A is thus $G=(R_1/R_2)$.

This refers to a particular configuration of amplifier A enabling the characteristics of the transmission band to be obtained, and the stability of the amplification sought. The role of the Zener diode is accessory, it could be replaced by a capacity resistance circuit in parallel.

In order to ensure, during the elaborating of the voltage error, a perfect symmetry regarding signals coming from E and S, the impedance $Z_2$ is, as shown in FIG. 3, formed by an impedance identical to $Z_1$ and preceded by a low impedance resistive divider $Z'_2$, $Z''_2$ adjustable, enabling the attenuation $(1/G)$ to be exactly produced.

The regulating of a potentiometer $R_3$ provided in the circuit of the sources of the transistor $Q_6$ damps out the effect of its residual differential input voltage. The regulating of the resistance $R_4$ enables the effect to be minimized due to dielectric currents of $Q_6$ under the influence of temperature variations. These adjustments are the more stable as the transistor $Q_6$ operating as an input stage of a error amplifier, always works to the same operating point. Amplifier B′ at the output of transistor $Q_6$ effects the amplifying to the necessary voltage. The condensers $C_2$ to $C_5$ also intervene in modeling the response curve of amplifier B.

In amplifier A, utilization of a capacitive link $C_1$ between the transistors $Q_1$ and $Q_2$ enables each of the elements of the circuit to be placed in its best operating zone, independently of any other consideration, in particular, the dispersions on the voltage source of $Q_1$. The intentional error resulting from this on the transmission of low frequency signals and the continuous component is taken up by the play of the subjection.

In order to effect the phasing mentioned in the description of FIG. 1 and in all cases where it is necessary to superimpose a continuous component or alternative on the output signal, a current $I_{b1}$ can be injected at $b_1$ as shown in FIG. 3.

Of course, the invention is not restricted to the single mode of embodiment that has just been described by way of particular example, and numerous alternatives can be applied to it, specifically with regard to selecting constituent elements as a function of the performances sought.

I claim:

1. An amplifying device having a wide transmission band, low drift and enabling a continuous component to be transmitted from a high-frequency signal which comprises: a first high-frequency amplifier having a wide transmission band and high input impedance, said first amplifier including a first transistor of the field effect type forming a high input impedance stage and to the input of which the high-frequency signal is connected, the output of said first transistor being connected through a capacitor to the base of a second transistor, the emitter of said second transistor being connected to the base input of a third transistor through a pair of series-connected resistances, the emitter of said third transistor constituting the amplifier output for said high-frequency signal, a feedback circuit connected from the output of said first amplifier through a pair of series-connected impedances to the input thereof; a second dual input amplifier having a low drift, larger amplification than that of said first amplifier, small transmission band and low impedance which serves as an error correction amplifier for said first amplifier, a reference potential connected to a first input of said second amplifier, the second input of said second amplifier being connected to a tap between said series-connected impedances, the output from said second amplifier being connected to the input base of a fourth transistor, the emitter of said fourth transistor being connected to the emitter of a fifth transistor, the collector of said fifth transistor being connected to the base of said third transistor, a Zener diode having its cathode terminal connected to the base of said fifth transistor and its other terminal connected to a tap between said series-connected resistors, and a potential source for applying the operating potentials to said transistors, said potential source being connected to the collectors of said second, third and fourth transistors and also to said field effect transistor.